US012623649B2

(12) United States Patent
Farres et al.

(10) Patent No.: US 12,623,649 B2
(45) Date of Patent: May 12, 2026

(54) TRAILER CONNECTION STATUS DETERMINATION AND SHARING

(71) Applicant: Volvo Truck Corporation, Gothenburg (SE)

(72) Inventors: Lionel Farres, Heyrieux (FR); Christophe Long, Brindas (FR)

(73) Assignee: Volvo Truck Corporation, Gothenburg (SE)

( * ) Notice: Subject to any disclaimer, the term of this patent is extended or adjusted under 35 U.S.C. 154(b) by 286 days.

(21) Appl. No.: 17/783,754

(22) PCT Filed: Dec. 16, 2019

(86) PCT No.: PCT/EP2019/085421
§ 371 (c)(1),
(2) Date: Jun. 9, 2022

(87) PCT Pub. No.: WO2021/121549
PCT Pub. Date: Jun. 24, 2021

(65) Prior Publication Data
US 2023/0024317 A1     Jan. 26, 2023

(51) Int. Cl.
*B60T 17/22* (2006.01)
*B60D 1/62* (2006.01)

(52) U.S. Cl.
CPC ................ *B60T 17/22* (2013.01); *B60D 1/62* (2013.01)

(58) Field of Classification Search
None
See application file for complete search history.

(56) References Cited

U.S. PATENT DOCUMENTS 6,754,568 B1 * 6/2004 Ripley ...................... G01L 5/28
                                                                  701/32.8
2010/0085172 A1 * 4/2010 Ancuta ................... B60T 17/22
                                                                  340/431
(Continued)

FOREIGN PATENT DOCUMENTS

DE        4200302 A1   7/1993
DE       19955798 A1   5/2001
(Continued)

OTHER PUBLICATIONS

International Search Report and Written Opinion for International Patent Application No. PCT/EP2019/085421, mailed Oct. 16, 2020, 11 pages.

*Primary Examiner* — Abby J Flynn
*Assistant Examiner* — Bakari Underwood
(74) *Attorney, Agent, or Firm* — Withrow & Terranova, PLLC

(57) ABSTRACT

Systems and methods carried out in a truck (TW) configured to be coupled to a trailer (TR), wherein a trailer connection status (CST) is determined by a pneumatic line test performed on a test pneumatic line arranged to pneumatically couple the trailer to the truck, the method comprising
    determining a line test circumstantial criterion, such criterion allowing or not a pneumatic line test to be performed,
    performing the pneumatic line test, whenever the test circumstantial criterion allows it, and
    updating therefrom the trailer connection status (CST), from a result of step b— and/or as time passes by,
    wherein the line test circumstantial criterion comprises at least a first condition representative of an air pressure prevailing in the pneumatic line below a predefined test
(Continued)

threshold, a second condition representative of a presence, and/or activity of a driver of the truck in the truck's cabin.

14 Claims, 6 Drawing Sheets

(56) References Cited

U.S. PATENT DOCUMENTS

| 2013/0008245 | A1* | 1/2013 | Andersen | B60T 13/263 |
| | | | | 73/121 |
| 2016/0257289 | A1* | 9/2016 | Barth | B60T 8/171 |
| 2017/0103101 | A1* | 4/2017 | Mason | G06F 16/2365 |
| 2020/0383580 | A1* | 12/2020 | Shouldice | A61B 5/02416 |

FOREIGN PATENT DOCUMENTS

| DE | 102010026411 A1 | 1/2012 |
| DE | 102017126976 A1 | 5/2019 |

* cited by examiner

TRAILER CONNECTION STATUS DETERMINATION AND SHARING

This application is a 35 USC 371 national phase filing of International Application No. PCT/EP2019/085421, filed Dec. 16, 2019, the disclosure of which is incorporated herein by reference in its entirety.

FIELD OF THE DISCLOSURE

The present disclosure relates to methods and systems to determine connection status of pneumatic lines of a trailer that can be coupled to a towing vehicle. The connection status, namely coupled or uncoupled, is determined by a pneumatic test procedure.

BACKGROUND OF THE DISCLOSURE

A semi-trailer combination comprises a truck (otherwise called 'tractor unit') and a trailer. Often, however not mandatory in the sense of the present disclosure, such trailer has no front axle, the front portion of the trailer can be detachably coupled to a mechanism called "fifth wheel" of the tractor unit. The truck comprises a powertrain, a pneumatic supply system, a braking system, and a lot of other onboard systems.

Between the truck and a trailer, there are provided an electrical coupling arrangement and a pneumatic coupling arrangement. The present disclosure will mainly discuss the pneumatic coupling arrangement, and the coupled or uncoupled status of the pneumatic coupling.

The pneumatic coupling arrangement comprises a pressure supply line, having a red color code in the art and a service brake line having a blue color code in the art. The red color pressure supply line supplies the park brake spring loaded cylinders of the trailer. When no air pressure is supplied to the red pressure supply line, the springs of the spring loaded cylinders apply a braking effort to the trailers wheels. By contrast, when air pressure is supplied to the red pressure supply line, the springs of the spring loaded cylinders of the trailer are pushed back and the braking effort is released.

In this context, it is important to know whether there is a trailer coupled to the truck or no trailer, since the behavior of the truck is very different between a truck-only configuration and a semi-trailer combination configuration.

The trailer connection status (coupled or uncoupled) can be determined mechanically or electrically; however, this requires additional material like one or more sensor. The present disclosure considers the case when the trailer connection status (coupled or uncoupled) is determined by using at least a pneumatic line.

An ad hoc pneumatic test procedure allows to test the line using an already provided pressure sensor, thereby avoiding using additional sensing device.

SUMMARY OF THE DISCLOSURE

According to one aspect of the present disclosure, it is disclosed a method carried out in a truck (TW) configured to be coupled to a trailer (TR), wherein a trailer connection status (i.e. coupled or uncoupled) is determined by at least a pneumatic line test performed on at least one test pneumatic line (41,42) arranged to pneumatically couple the trailer to the truck, the method comprising:

a—determine a line test circumstantial criterion, such criterion allowing or not a pneumatic line test to be performed, b—perform the pneumatic line test, whenever the test circumstantial criterion allows it, c—update the trailer connection status, from a result of step b- and/or as time passes by, wherein the line test circumstantial criterion comprise at least a first condition representative of an air pressure prevailing in the pneumatic line (41,42) below a predefined test threshold, a second condition representative of a presence and/or activity of a driver of the truck in the truck's cabin.

The term "pneumatic line test" should be understood as a method for generating an air pressure pulse in a pneumatic line and analyzing a pressure response in a timely manner, i.e. deducing, from a curve of pressure against time, aeraulic characteristic of the line. From such aeraulic characteristic of the line, it is determined whether the trailer is actually coupled to the truck or not (i.e. the trailer connection status, pneumatically wise).

Advantageously, it is contemplated to have a looped method, i.e. step a- to c— are repeated as long or often as necessary.

Advantageously, the pneumatic line test is performed when the driver is inside the cabin, and therefore we avoid performing the test when the driver might be in the course of practicing the coupling maneuver at the back of the cabin. It shall be understood that the pulse test occurrence can be surprising for someone standing just in the vicinity of the glad hand couplings. Therefore, performing the line test according the promoted conditions eliminates the risk of surprising the driver and the risk of fall and this solution thus enhances overall safety.

Also, the line test procedure is not performed whenever the test line is already inflated.

The trailer connection status may be a simple binary information or a binary information complemented by a confidence index that will be discussed later.

We note that a reliable trailer connection status can be useful to other entities or control units aboard the truck, such that these entities or control units can adapt the behavior of some function of the truck, notably engine management, anti-locking of brakes, suspension, etc.

The method may comprise, prior to step a—, the following step:

a0—initialize a trailer connection status (CST)

Regarding this step a0, the trailer connection status is initialized either with the latest known value, or with a default value.

In various embodiments, one may possibly have recourse in addition to one and/or other of the following arrangements, taken alone or in combination.

According to one aspect, the test circumstantial the second condition representative of a presence and/or activity of a driver of the truck in the truck's cabin includes relies on a maneuver performed by the driver of the truck. Among the maneuvers at stake, we can consider actuating the trailer supply knob (red knob), actuating the truck Park brake knob (yellow knob), actuating the gearbox lever (changing gear). It is also considered optionally to include: actuating the clutch pedal, opening or closing the driver's door. A time window after the maneuver can be provided for performing the line pneumatic test, or the line pneumatic test can be performed as soon as a maneuver is detected. We note here that the line pneumatic test may be triggered or may not according to other conditions and generally to the test circumstantial criterion.

According to one aspect, the trailer connection status (CST) is supplemented by a confidence index, which decreases over time unless refreshed or reset by an updating event(s), where the line test circumstantial criterion further comprises at least a third condition representative of the confidence index being less than a predefined confidence threshold. It can be contemplated to refrain from doing again the pneumatic line test when the confidence index is above a certain threshold, and conversely to carry out the pneumatic line test when the confidence index is below a certain threshold, in order to refresh the knowledge of the pneumatic coupling, or at least to reduce the uncertainty. Using such a confidence index evolving over time and reset by special conditions allows to decrease the number of occurrences of pneumatic line test.

According to one aspect, the confidence index (CDI) exhibits a value between a maximum value and a minimal value, and the confidence index (CDI) is reset to its maximum value whenever the test pneumatic line is inflated or whenever the truck is determined to be in driving conditions. Thereby, we improve the relevance and usefulness of the confidence index in order to further decrease the number of occurrences of pneumatic line test.

According to one aspect, the confidence index (CDI) is frozen as long as a presence of a truck's driver in the truck's cabin is determined. Such a presence can be determined via a driver seat occupancy sensor and/or a drowsiness surveillance camera. Thereby, we improve the relevance and usefulness of the confidence index in order to further decrease the number of occurrences of pneumatic line test. Further, even though the driver does not change any control/actuator, it is still possible to perform the pneumatic line test without surprising the driver, since he/she is known to be in the cabin.

According to one aspect, the test circumstantial criterion comprises at least a fourth condition representative of an air pressure prevailing in the air reservoir. In practice, the pressure pulse test can only be carried out reliably if enough pressure is available in the pneumatic source (pump, pressurized reservoir).

According to one aspect, the pneumatic line test is done by a temporary inflation of the test pneumatic line, and the outcome of the test is inferred from a pressure profile versus time acquired in response to the temporary inflation. We use here a pressure sensor, already provided, which acquires the pressure prevailing in the pneumatic line. We note here that no additional sensor is required. The pressure sensor allows to monitor the pressure and in particular the pressure time gradient during the temporary inflation, and the pressure time gradient allows to know if the pneumatic line is properly coupled to a trailer or if the pneumatic line is open to atmosphere or if the pneumatic line is closed. (cf FIG. 4).

According to one aspect, the test pneumatic line is the trailer air pressure supply line. In practice, this line is color code in red for the US market. The control of the trailer supply line is done through a controlled electro-valve, and there is provided a software to control this electro-valve according to a predetermined test profile.

A complementary test on the service brake line is not excluded though.

According to one aspect, wherein when the pneumatic line test is positive, namely representative of a trailer actually pneumatically coupled, the supply of the trailer air pressure supply line is continued and maintained as long as required by the trailer management function. Therefore in standard condition, the pneumatic test doesn't delay the normal supply of compressed air to the trailer.

According to one aspect, the pneumatic line test is postponed as long as the trailer pressure supply line is or remains inflated above a predetermined threshold.

As long as the pressure supply line remains inflated, it is thus inferred that the status is coupled (or attached) and the confidence index remains high.

According to one aspect, there may be provided a predefined time window following a maneuver performed by a driver of the truck in the cabin to carry out the line test. This time window after the maneuver can be provided for performing the line pneumatic test with sufficient time and reliability. This time window is however short, notably shorter than the time needed for the driver to go out of the cabin and handle trailer pipes connections.

According to one aspect, the method may further comprise:

d—propagate the trailer connection status through the truck bus.

We note that the trailer connection status is propagated to other entities or control units aboard the truck, and these entities or control units can adapt therefrom the behavior of some function of the truck, notably engine management, anti-locking of brakes, suspension, etc.

According to one aspect of the present disclosure, it is disclosed a system comprising a parking brake unit having a control unit, the system being installed in a truck (TW) configured to be coupled to a trailer (TR), wherein the control unit is configured to determine a trailer connection status (i.e. coupled or uncoupled) from at least a pneumatic line test performed on at least one test pneumatic line (41,42) arranged to pneumatically couple the trailer to the truck, wherein the control unit is configured to:

a0—initialize a trailer connection status (CST)

a—determine a line test circumstantial criterion, such criterion allowing or not a pneumatic line test to be performed, b—perform the pneumatic line test, whenever the test circumstantial criterion allows it, c—update the trailer connection status, from a result of step b- and/or as time passes by, d—propagate the trailer connection status through the truck bus, wherein the line test circumstantial criterion comprise at least a first condition representative of an air pressure prevailing in the pneumatic line (41,42) below a predefined test threshold, a second condition representative of a presence or activity of a driver of the truck in the truck's cabin.

According to one aspect, the control unit may be further configured to handle a confidence index (CDI) that supplements the trailer connection status, said confidence index (CDI) is caused to decrease over time unless refreshed or reset by an updating event(s), where the line test circumstantial criterion further comprises at least a third condition representative of the confidence index being less than a predefined confidence threshold (CDIS).

According to one aspect, the system may further comprise a gearbox gear lever/control, a park brake knob (11), and a trailer supply knob (12) arranged for determining the second condition representative of a presence or activity of a driver of the truck in the truck's cabin. These devices are used to determine a maneuver performed by the driver of the truck, and therefore the second condition can rely on a maneuver performed by the driver, in a reliable manner.

According to one aspect, the system may further comprise a driver seat occupancy sensor and/or a drowsiness surveillance camera arranged for determining the second condition representative of a presence or activity of a driver of the truck in the truck's cabin. Thereby, the confidence index can be frozen as long as a presence a truck's driver in the truck's cabin is determined, and we further improve the relevance of this confidence index.

According to one aspect, the system may further comprise a pressure sensor (81) arranged on the trailer supply line (41). Thereby this pressure sensor which acquires the pressure prevailing in the pneumatic line allows to monitor the pressure and in particular the pressure time gradient during the temporary inflation, and the pressure time gradient allows to know if the pneumatic line is properly coupled to trailer or if the pneumatic line is open to atmosphere or if the pneumatic line is closed.

The present disclosure is also directed at a truck comprising a system as mentioned above or carrying out the method as mentioned above.

BRIEF DESCRIPTION OF THE DRAWINGS

Other features and advantages of the invention appear from the following detailed description of two of its embodiments, given by way of non-limiting example, and with reference to the accompanying drawings, in which.

DETAILED DESCRIPTION OF THE DISCLOSURE

Figures 1, 2:
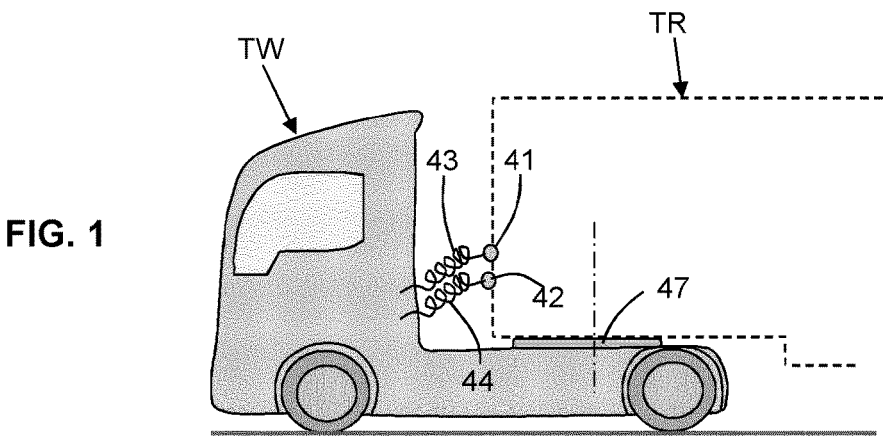
FIG. 1 illustrates diagrammatically a side elevation view of semi-trailer combination configuration.
FIG. 2 shows a schematic block diagram of an example of a system promoted in the present disclosure.

In the figures, the same references denote identical or similar elements. For sake of clarity, various elements may not be represented at scale.
System Overview FIG. 1 shows a truck denoted TW (otherwise called 'tractor unit') with a "fifth wheel" adapted to receive a 'semi' trailer denoted TR namely a trailer without a front axle. The trailer TR is shown in dotted line since, the truck may be alone (truck-only configuration) or present and attached (semi-trailer configuration).

The front portion of the trailer TR can be detachably coupled to the truck. The front portion of the trailer TR is detachably coupled, both mechanically (thanks to the "fifth wheel" mechanism 47 of the truck), electrically and pneumatically.

Besides, the truck TW comprises, among other entities, a powertrain, a pneumatic supply system, and a braking system, that will be discussed below.

The pneumatic coupling arrangement comprises a pressure supply line 41,43 having a red color code and a service brake line 42,44 having a blue color code. The red color pressure supply line supplies the park brake spring loaded cylinders of the trailer. The blue color supply line supplies the service brake to the brake cylinders of the trailer.

The pneumatic coupling relies on an interface named 'glad hand'. For the red line, a first part 41a arranged on the truck cooperates with counterpart formed as a second part 41b arranged on the trailer. The first part 41a is attached to the front wall of the trailer and the second part 41b lies at the free end of a flexible extensible pneumatic pipe 43, said extensible pneumatic pipe being coupled to the truck air brake system.

Similarly, for the blue line, a first part 42a arranged on the truck cooperates with counterpart formed as a second part 42b arranged on the trailer. The first part 42a is attached to the front wall of the trailer and the second part 42b lies at the free end of a flexible extensible pneumatic pipe 44, said extensible pneumatic pipe being coupled to the truck air brake system.

We note here that a second trailer can be coupled to the trailer which is attached to the truck, forming a double trailer configuration, which is also encompassed in the present disclosure.

As illustrated at FIG. 2, the system comprises a parking brake unit 3 having a control unit 6. The parking brake unit is in charge of supplying various arranged s braking components of the truck TW, and also in charge of supplying compressed air and service brake to the trailer TR.

There are provided various other control units within the truck, like for example an engine control unit 32, a steering control unit 33, a gearbox control unit 34, a suspension control unit 35, without excluding further control units 36.

There is also provided a wheels anti-locking system or function (known in the art as ABS or ABR) included in one above control unit, or as a separate unit. The anti-locking function receives the rotation speed of each vehicle wheel VSS.

There is provided a first pressure sensor 81 on the trailer supply line.

In the illustrated example there is also provided second pressure sensor 82 arranged on the service brake line.

Further, the system comprises at least one air reservoir 5 with its own pressure sensor 85.

Regarding the actuation item(s) available for the truck driver, there is provided a truck parking brake knob 11 and a trailer supply knob 12. The truck parking brake knob is usually yellow. The trailer supply knob is usually red. They are usually pushed to supply air. In the illustrated example, at least the trailer knob (red knob) is of the pushbutton type (not bistable knob).
Connection Status & Line Test We discuss here how the pneumatic connection status is defined. Physically speaking, for one pneumatic line at stake, the glad hand of the truck 41b can be either properly coupled to the trailer 41a glad hand, or not properly coupled to the trailer glad hand. However, since there is no sensor on the glad hands, the electronic control unit(s) is not aware directly of the physical position of the glad hand connection.

In the present disclosure, the physical position of the glad hand connection is inferred from a pneumatic line test that will be detailed below.

Figure 3:
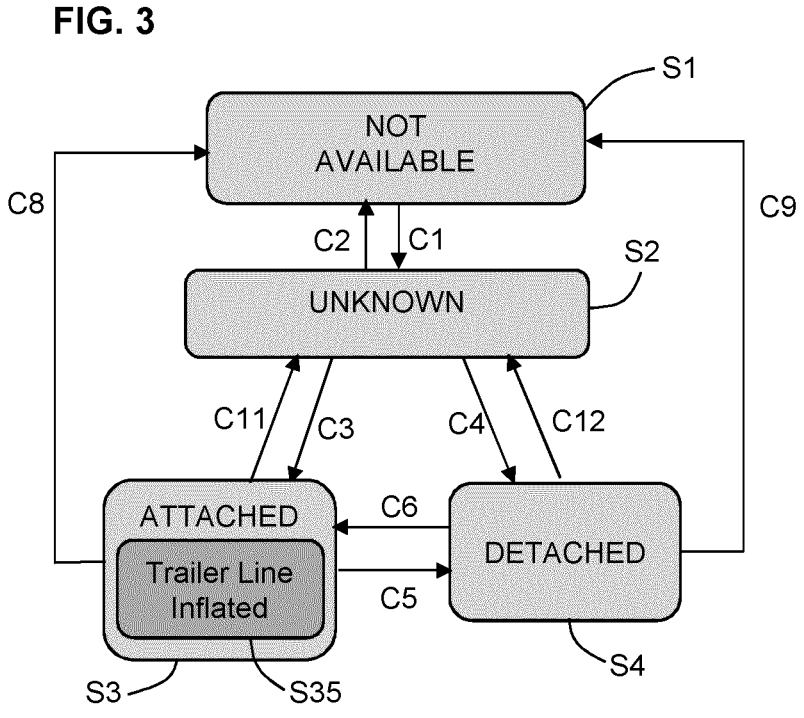
FIG. 3 shows an example of a state-chart implemented in a method carried out according to the present disclosure.

As illustrated at FIG. 3, there is defined four different states as viewed from the electronic control unit(s):

'NOT AVAILABLE' (S1): the pneumatic line test cannot be performed, for example due to insufficient air pressure in the pneumatic system; therefore it is not possible to know the physical position of the glad hand connection, 'UNKNOWN' (S2): the physical position of the glad hand connection is not known, although there is enough air pressure in the pneumatic system, but time has passed since the last test result, or an event has occurred that has undermined the knowledge of the connection status 'ATTACHED' (S4): the physical position of the glad hand connection is known as properly coupled, just after the line test or along a time interval thereafter, said time interval may be long as will be seen later on. 'Attached' is also called 'Coupled' in the present disclosure.

'DETACHED' (S3): the physical position of the glad hand connection is known as not coupled or at least not properly coupled, just after the line test or along a time interval thereafter, said time interval may be long as will be seen later on. 'Detached' is also called 'Uncoupled' in the present disclosure.

There can be defined a fifth state, which is a sub-state of 'Attached'. The state 'Trailer Line Inflated' (S35) denotes a condition when the glad hand connection is properly coupled, and the line exhibits a pressure above a minimal threshold, nominally the standard supply pressure, let's say at least 6 bars.

Figure 4:
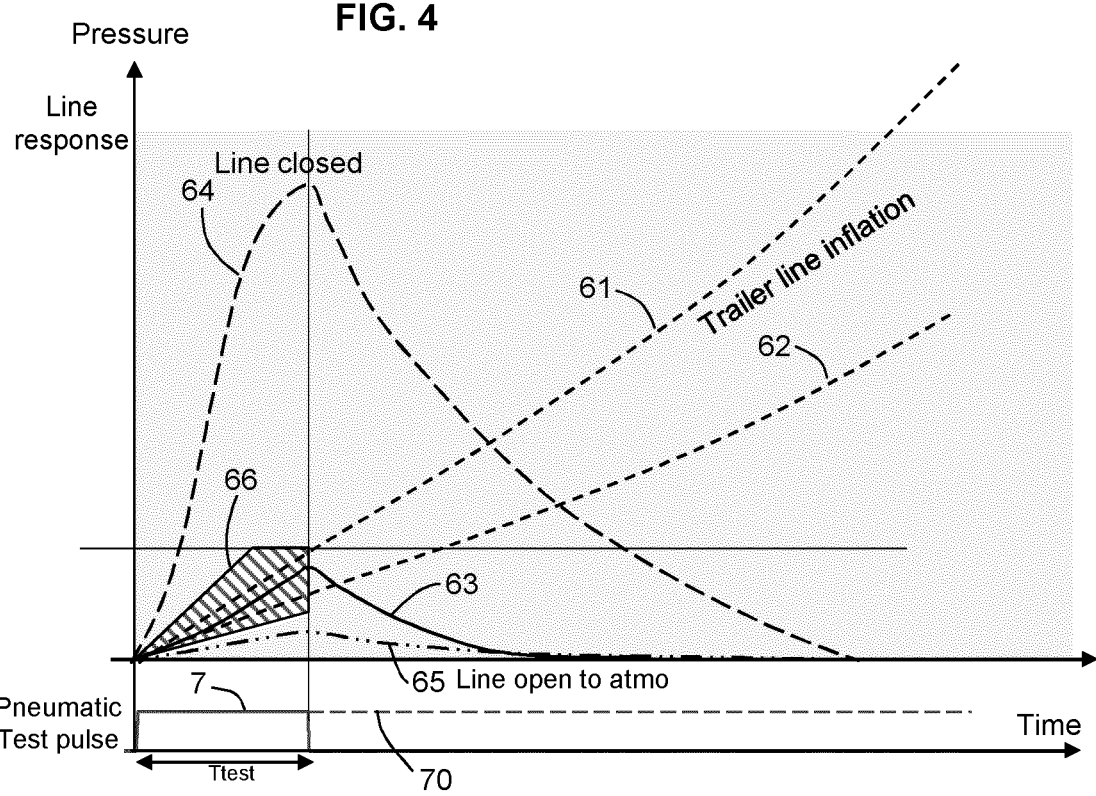
FIG. 4 shows a time-chart illustrating various possible examples of pneumatic detection test pulse and their respective responses.

FIG. 4 illustrates how the pneumatic test is carried out. The line under test here is the trailer supply line (red glad hand). In addition, the skilled person can consider a similar or identical test on the trailer service brake line (blue glad hand).

The glad hand 41*b* at the free end of the flexible extensible pneumatic pipe 43, when not properly coupled to the counterpart hand, can be stowed in a rest position at the back of the cabin. At this rest position, the glad hand 41*b* at the flexible extensible pneumatic pipe 43, can be open to atmosphere or can be closed.

At FIG. 4, there are various cases represented in the same time-chart. A pulse test 7 is generated in the line. In practice, an electro-valve supplying the line is open for a predetermined time period noted Ttest. Stated otherwise, we perform a temporary inflation of the test pneumatic line, from a deflated state. The outcome of the test is inferred from a pressure profile versus time acquired in response to the temporary inflation. The pressure time gradient during the temporary inflation is of particular interest.

Various responses corresponding to various situations are shown.

Chronogram 65 illustrates a case when the pneumatic lined is open to atmosphere. Time gradient during the temporary inflation is very low. Chronogram 64 illustrates a case when the pneumatic lined is closed. Time gradient during the temporary inflation is very high.

Chronograms 61,62,63 illustrate cases when the pneumatic lined is correctly coupled (glad hand attached). Time gradient during the temporary inflation is moderate. The area denoted 66 in the chart reflects an interval of possible time gradients considered to be representative of a proper connection (connection status=attached). There is a substantial volume of air pipe(s) in the trailer that provokes this moderate gradient.

Here we face two sub-cases, either the inflation of the trailer is required, or only the test is required but the inflation of the trailer is not required.

Chronogram 62 illustrates a case when the pneumatic line is correctly coupled and with inflation required. Time gradient during the temporary inflation is moderate but low. Chronogram 61 illustrates a similar case, but with a time gradient moderate but somewhat higher. Conversely, chronogram 63 illustrates a case when the pneumatic line correctly coupled but inflation is not required. At the end of the test time period, the electro-valve is shut off and the pressure in the line decreases back to 0.

When line inflation is required, the supply of the trailer air pressure supply line is continued (dotted line 70) and maintained as long as required by the trailer management function. We note here that the pneumatic test doesn't delay the normal supply of compressed air to the trailer.

The pressure sensor 81 already mentioned is used to monitor the pressure gradient in the line. The pulse duration Ttest can be made dependent on the pressure gradient. Test can be shorter if the gradient is high enough (but still below the "closed line" threshold). The pulse duration Ttest can be comprised between 400 ms and 1 second. According to one embodiment, duration Ttest can be comprised between 500 ms and 700 ms.

Conditions and Criteria for Line Testing

Figure 6:
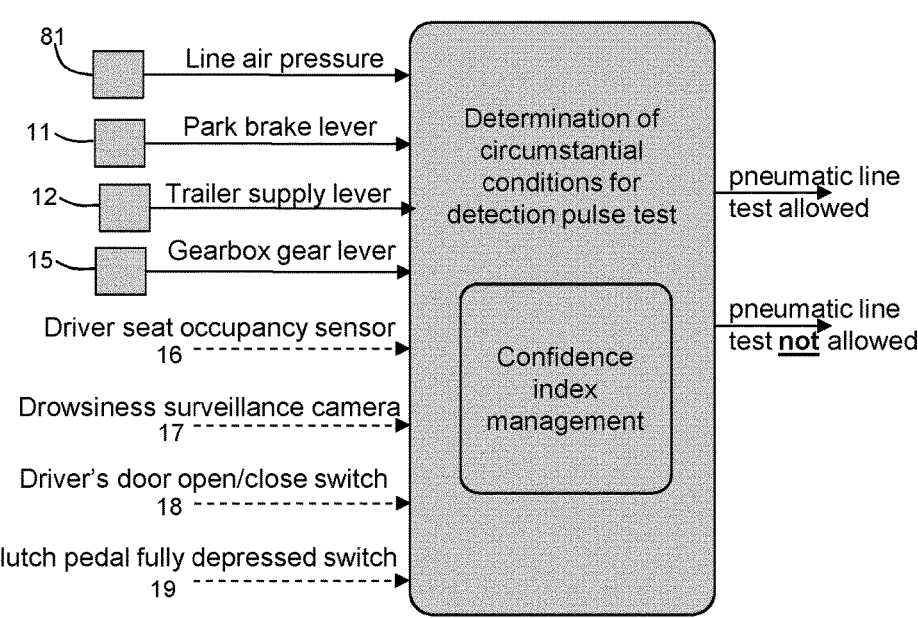
FIG. 6 illustrates a flow diagram relating to a determination of circumstantial conditions for detection pulse test.

The pneumatic test is carried out according to particular conditions; the decision making criterion is exposed below and illustrated at FIG. 6. Care is take to avoid surprising the truck driver if he/she might be in the process of coupling or uncoupling the pneumatic pipes at the back of the cabin.

Advantageously, besides the connection status already mentioned, a confidence index is defined to minimize the occurrences of the line tests.

The line test circumstantial criterion comprise at least a first condition representative of an air pressure prevailing in the pneumatic line 41 a predefined test threshold, and a second condition representative of a presence or activity of a driver of the truck in the truck's cabin.

More precisely regarding the first condition, if the pneumatic line 41 has a high pressure (in practice above predefined threshold), the state S5 'Trailer Line Inflated' is assumed, and therefore there is no need to perform a test. Conversely, when the pneumatic line 41 has a low pressure, a test might be necessary to determine the connection status. Additionally, we note here that the test performance supposes a deflated line to begin with.

More precisely regarding the second condition, representative of a presence and/or activity of a driver of the truck in the truck's cabin, this second condition relies on a maneuver performed by the driver of the truck which denotes his/her presence.

Among the maneuvers at stake, we consider at least:

actuating the trailer supply knob 12 (red knob), actuating the truck Park brake knob 11 (yellow knob), actuating the gearbox lever 15 (changing gear, i.e particularly go out of Neutral, or go into Neutral).

Optionally, we also include:

actuating the clutch pedal 19, i.e. fulling depressing the clutch pedal, opening or closing the driver's door 18.

Each of all these actions generates an electrical transition in one or more control unit(s) and denotes/reflects a movement of the driver inside the cabin (or just outside the door for the door switch).

We note here that the line pneumatic test may be triggered or may not according to other conditions and generally to the test circumstantial criterion.

Additionally, there is provided system or device(s) to determine a presence a truck's driver in the truck's cabin. Such a presence can be determined via a driver seat occupancy sensor 16 and/or a drowsiness surveillance camera 17.

Criterion to trigger a line test is denoted CRIT and an example of definition can be as follows with the formula:

$$CRIT=(P85>P5 \text{ min}) \text{ and } (\text{Press81init}<PTh) \text{ and}$$
$$(CDI<CDIS) \text{ and (driver cab timw)}$$

Where:

P85 denotes the current pressure in the air reservoir 5, P5 min denotes a minimal pressure in the air reservoir to perform reliably the line test, P5 min can be 6 bars.

Press81init denotes the current pressure in the line at stake (here trailer supply).

PTh denotes a maximal pressure in the line at stake to perform reliably the line test.

PTh can be 1 bar.

CDI is the confidence index already mentioned above.

CDIS is the already mentioned predefined confidence threshold.

"driver cab timw" denotes a time window after a maneuver performed by the driver, as set out above.

The confidence index CDI is a value handled by the control unit 6 to optimize the way the line test is carried out.

The confidence index CDI is comprised between 100% (full confidence in last connection status) and 0% (confidence lost), all the intermediate values are also possible; the greater the value the greater the confidence in the last known connection status.

The confidence index CDI decreases over time, unless refreshed or reset by an updating event(s).

More precisely, a driving condition (i.e. speed above zero) restore the confidence index CDI to 100% is the value has not decreased below CDIS.

The confidence index CDI is linked either to the 'attached/coupled' status or to the 'detached/uncoupled' status.

Decrease CDI if: (Gear at Neutral) and (trailer line deflated) and (truck park brake set)

As described above, the line test circumstantial criterion further comprises at least a third condition representative of the confidence index CDI being less than a predefined confidence threshold CDIS.

Further it may be contemplated to freeze the confidence index CDI as long as a presence a truck's driver in the truck's cabin is determined just after a maneuver and a line test, see comment about FIG. 10 below. The confidence index CDI can be frozen at 100% value or at another value provided is it still above the predefined confidence threshold CDIS.

Propagating/Sharing with Other ECU(s)

The promoted method may include a step denoted d— of propagating the trailer connection status through the truck bus.

Other ECU(s) may benefit from this piece of information for various purpose, notably to adapt the expected dynamic characteristics of the semi-trailer combination configuration. It may concern: engine management system for torque and power applied on the semi-trailer combination configuration, suspension control system for height control, brake system for relevant adaptation to semi-trailer behavior, The line test can be required by another function/ECUs. This additional test case can be done in accordance with the criterion mentioned above.

Functional Behaviour

Referring again to FIG. 3, transition C1 from state S1 to S2 occurs when air pressure becomes available and enable reliable line testing.

Transition C3 from state S2 to S3 occurs after a line test giving a positive result, i.e. a proper line connection. Transition C6 from state S4 to S3 also occurs after a line test giving a positive result, i.e. a proper line connection.

Transition C4 from state S2 to S4 occurs after a line test giving a negative result, i.e. no proper line connection could be determined. Transition C5 from state S3 to S4 also occurs after a line test giving a negative result, i.e. no proper line connection could be determined.

Transitions C2 from state S2 to S1 occurs when air pressure becomes unavailable, for example in case of purge of the air reservoir(s). Similarly, transitions C8 and C9 from state S3 or S4 to S1 occurs when air pressure becomes unavailable, for example in case of purge of the air reservoir (s).

Transition C11 from state S3 to S2 occurs when the confidence index CDI has decreased below a predefined confidence threshold CDIS. Similarly, transition C12 from state S4 to S2 occurs when the confidence index CDI has decreased below a predefined confidence threshold CDIS.

Figure 5:
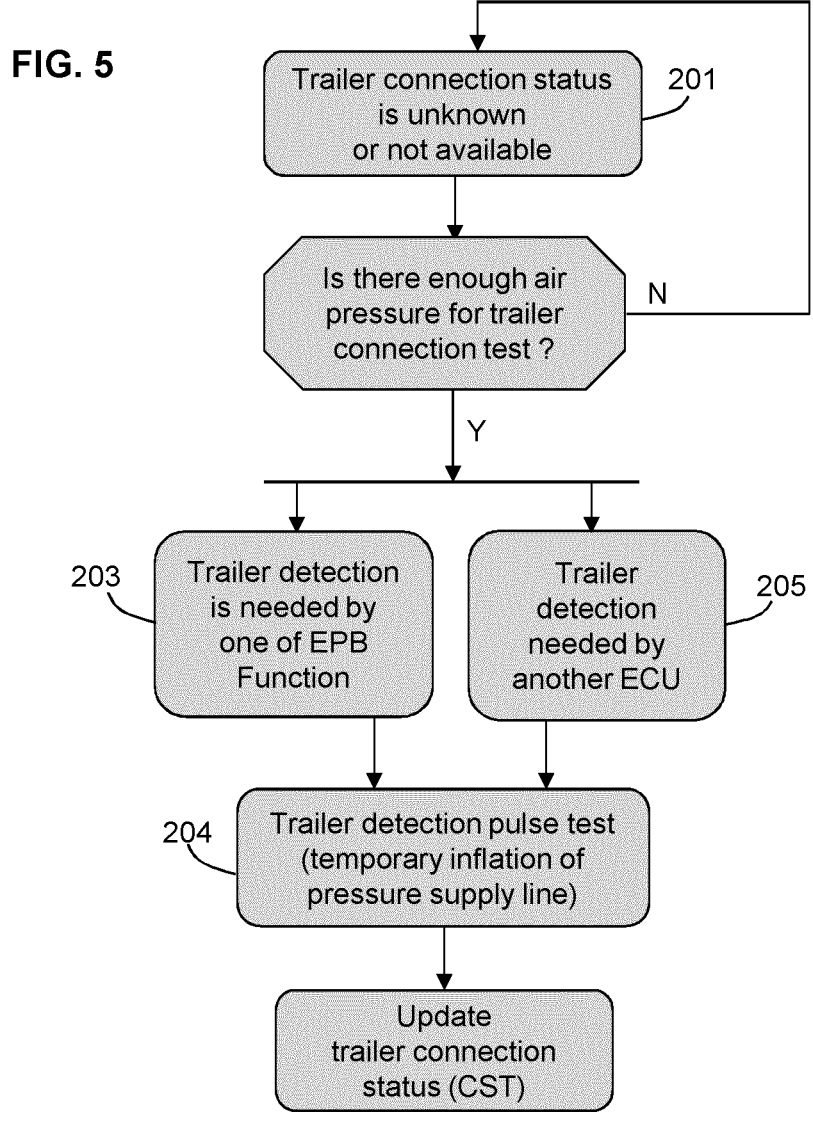
FIG. 5 illustrates a logic diagram a method carried out according to the present disclosure.

Referring to FIG. 5, step 200 represents a state "Trailer connection status is not available" unknown or not available".

At step 201, it is determined whether there is enough air pressure for trailer connection test. Step 202 represents a state "Trailer connection status is unknown".

At step 203, Trailer detection is needed by one of EPB Function.

We note here that the Trailer detection can be required by another ECUs shown at step 205.

Step 204 represents the trailer detection pulse test (as mentioned above, it can be a temporary inflation of pressure supply line).

Step 206 represents Update trailer connection status (CST).

Figure 8:
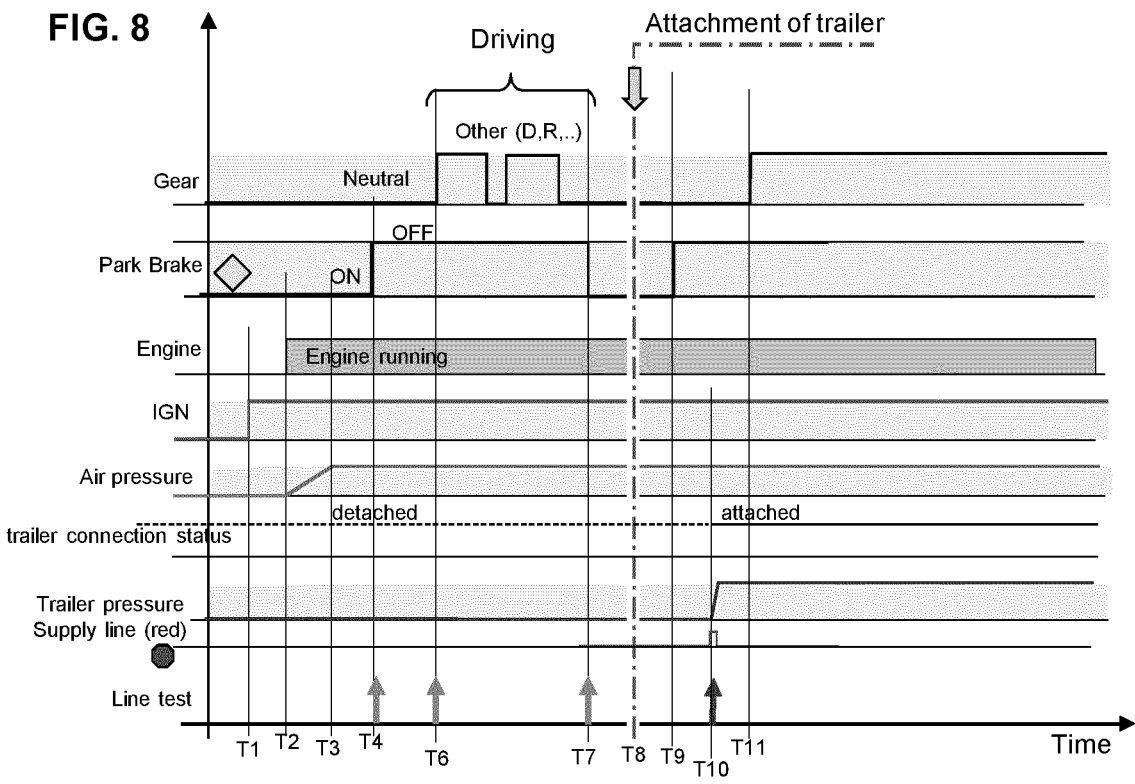
FIG. 8 shows a time-chart illustrating various operations and signals when a trailer is attached to the truck to become a semi-trailer configuration.

Referring to FIG. 8, the latest known trailer connection status is 'detached'. At instant T1 the truck driver turn ignition ON (line denoted 'IGN'), at instant T2 the engine is started, and inflation of the air reservoir begins. The air reservoir may be already filled or nearly filled, and in such case inflation to the pressure setpoint (8.5 bar) takes only few time. In some other cases inflation may take more time depending on the pressure remaining in the air reservoir at engine start. The pressure setpoint is reached at instant T3.

At instant T4, the truck driver releases the park brake. Also at T4, or just thereafter, a trailer connection is carried out at this time (vertical arrow at bottom line of the FIG. 8). In the exemplified case, the test is negative.

Later, at instant T5, the truck driver engages a gear (change from Neutral to Drive or Reverse). It may be considered to carry out another trailer connection test, although it is optional.

Later, at instant T6, the truck driver puts the gear into Neutral. Later, at instant T7, the truck driver applies the park brake. It may be considered to carry out another trailer connection test, although it is optional.

Later, at instant T8, the truck driver attach a trailer (mechanical, electrical and pneumatic coupling)

Later, at instant T9, the truck driver releases the park brake, and at instant T10, the truck driver presses the red knob to release the trailer park brake. We note that T10 can occur before T9.

In the exemplified case, the test is positive, and the inflation of the trailer supply line continues from the test pulse. Depending in the trailer air reserve, this requires more or less time.

The test being positive, the trailer connection status CST is changed to state S3 (attached) via transition C6. Further, the trailer connection status CST is propagated on the truck multiplex bus, so that other ECUs can benefit from the new status (here 'attached').

Later, at instant T11, the truck driver engages a gear and the truck together with the trailer move.

Figure 9:
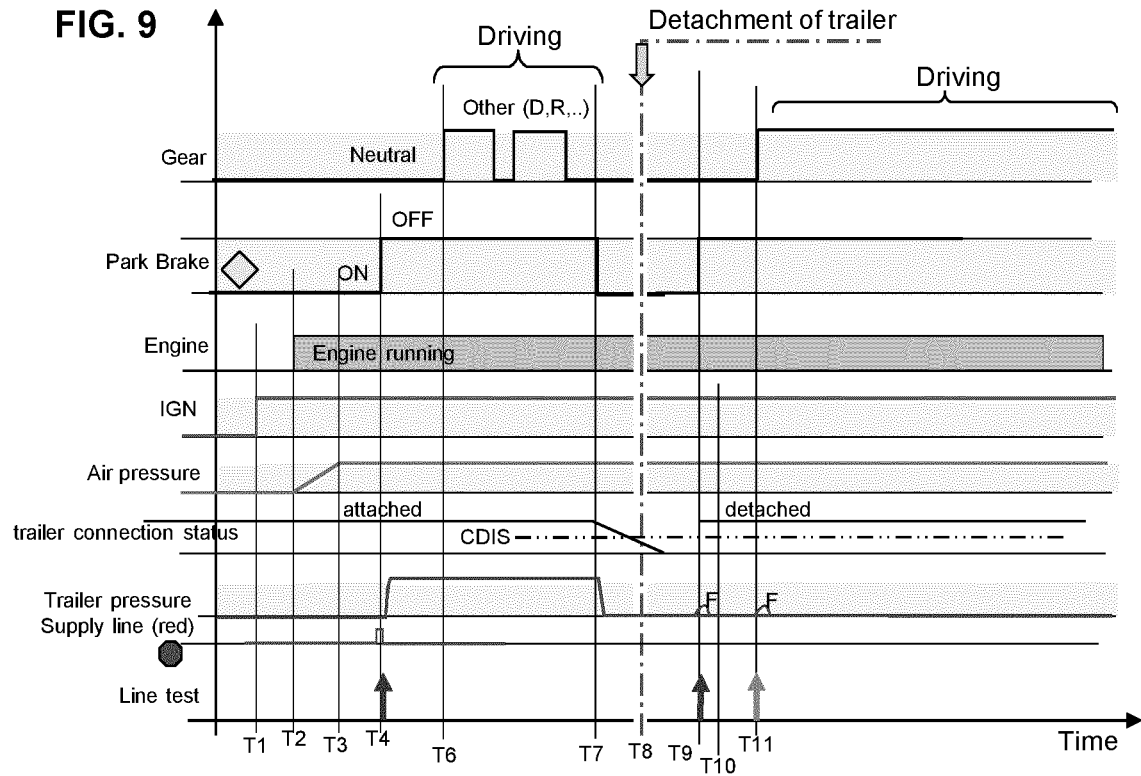
FIG. 9 shows a time-chart illustrating various operations and signals when a trailer is detached from the truck to become a bobtail truck-only configuration.

Referring to FIG. 9, the latest known trailer connection status is 'attached'. At instant T1 the truck driver turn ignition ON (line denoted 'IGN'), at instant T2 the engine is started, and inflation of the air reservoir begins. The air reservoir may be already filled or nearly filled, and in such case inflation to the pressure setpoint (8.5 bar) takes only few time or more time depending on the pressure remaining in the air reservoir at engine start. The pressure setpoint is reached at instant T3.

At instant T4, the truck driver releases the park brake, and presses the red knob to release the trailer park brake. A trailer connection is carried out at this time (vertical arrow at bottom line of the FIG. 9). In the exemplified case, the test is positive, the 'attached' status is confirmed. The inflation of the trailer supply line continues from the test pulse. Depending in the trailer air reserve, this requires more or less time.

Later, at instant T5, the truck driver engages a gear (change from Neutral to Drive or Reverse). Later, after moving, at instant T7, the truck driver puts the gear into Neutral and applies the park brake.

Later, at instant T8, the truck driver detach the trailer (mechanical, electrical and pneumatic decoupling).

Later, at instant T9, the truck driver releases the park brake.

Also at T9, or just thereafter, a trailer connection is carried out at this time (vertical arrow at bottom line of the FIG. 8). In the exemplified case, the test is negative. The test being negative, the trailer connection status CST is changed to state S4 (detached) by transition C5. Further, the trailer connection status CST is propagated on the truck multiplex bus, so that other ECUs can benefit from the new status (here 'detached').

Later, at instant T11, the truck driver engages a gear and the truck (without trailer) moves. It may be considered to carry out another trailer connection test, at T11, although it is optional.

Figure 7:
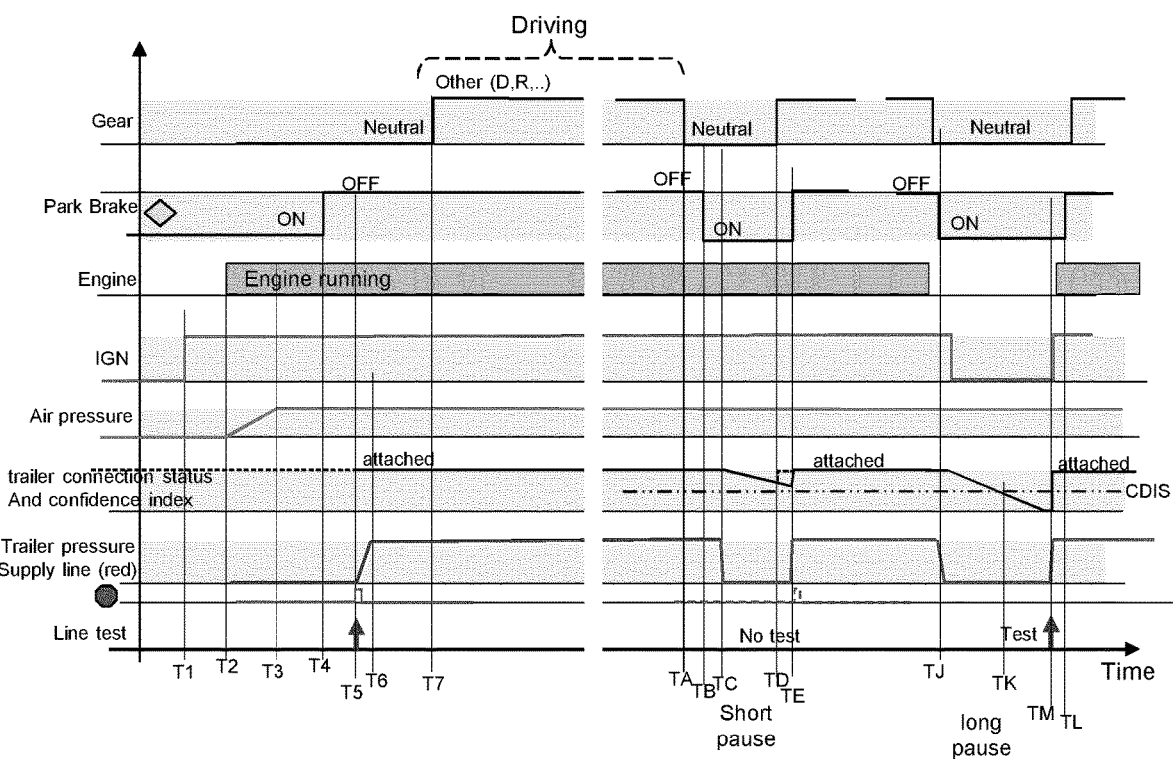
FIG. 7 shows a time-chart illustrating various operations and signals when the truck is in a s configuration.

Referring to FIG. 7, the latest known trailer connection status is 'attached'. At instant T1 the truck driver turn ignition ON (line denoted 'IGN'), at instant T2 the engine is started, and inflation of the air reservoir begins. The air reservoir may be already filled or nearly filled, and in such case inflation to the pressure setpoint (8.5 bars) takes only few time or more time depending on the pressure remaining in the air reservoir at engine start. The pressure setpoint is reached at instant T3.

At instant T4, the truck driver releases the park brake. At instant T5, the truck driver presses the red knob to release the trailer park brake. A trailer connection is carried out at this time (vertical arrow at bottom line of the FIG. 7). In the exemplified case, the test is positive, the 'attached' status is confirmed. The inflation of the trailer supply line continues from the test pulse. Depending in the trailer air reserve, this requires more or less time. At instant T6 the trailer supply line is pressurized and the trailer park brake is released (trailer ready to move).

Later, at instant T7, the truck driver engages a gear (change from Neutral to Drive or Reverse).

Later, after a short or long drive, at instant TA, the truck driver puts the gear into Neutral. Later, at instant TB, the truck driver applies the park brake. Later, at instant TC, the trailer supply line is purged to apply trailer park brake.

Later, after a short pause, at instant TD, the truck driver engages a gear, and at instant TE, the truck driver releases the park brake. During the short pause, the confidence index CDI decreases with time but remains above the predefined confidence threshold CDIS.

As soon as the truck moves, the confidence index CDI is reset to 100%. No new line test is required.

Later, after a short or long drive, at instant TJ, the truck driver puts the gear into Neutral and applies the park brake. Also the trailer supply line is purged to apply trailer park brake.

The pause is longer here.

In particular, the confidence index CDI decreases with time and becomes lower that the predefined confidence threshold CDIS, which occurs at instant TK.

After this longer pause, at instant T1M, the truck driver engages a gear, and releases the park brake. A trailer connection is carried out at this time (vertical arrow at bottom line of the FIG. 7), the result is positive since the trailer has not been detached.

Since the test is positive, the confidence index CDI is reset to 100%.

Later, at instant TL, the truck driver engages a gear and the truck together with the trailer move.

Figure 10:
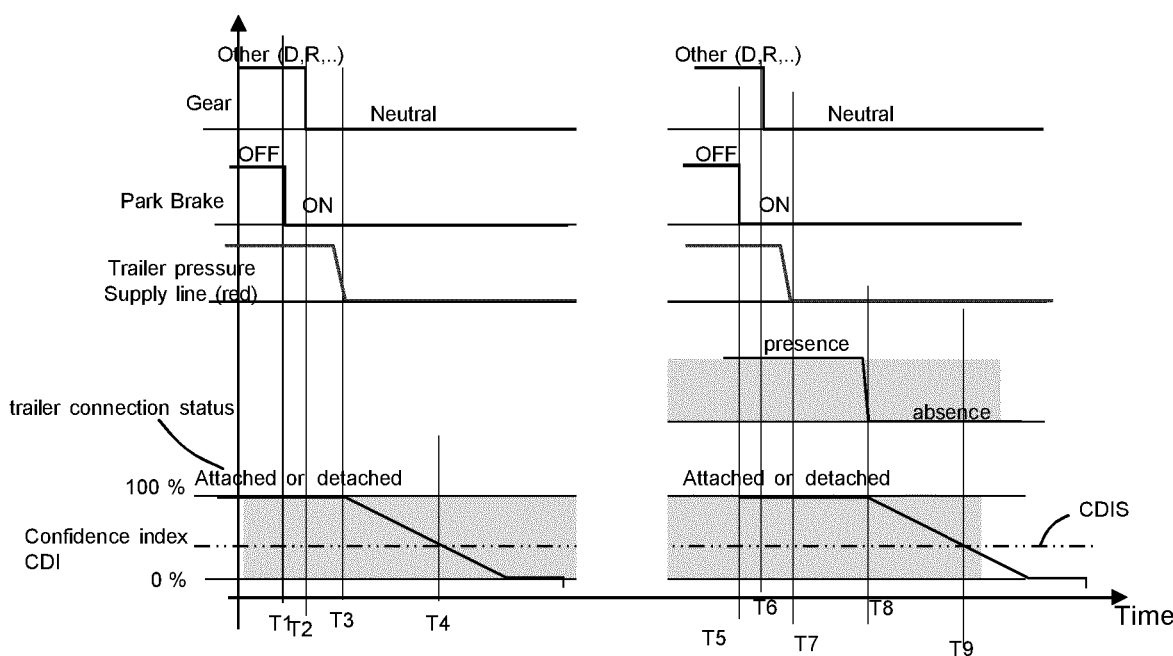
FIG. 10 shows a time-chart illustrating more in details an example of confidence index handling and behavior.

Referring to FIG. 10, the behaviour of the confidence index CDI is illustrated.

At instant T1, the truck driver applies the park brake. At instant T2, the truck driver puts the gear into Neutral. At instant T3, the trailer supply line is purged to apply trailer park brake.

The confidence index CDI decreases with time and becomes lower that the predefined confidence threshold CDIS, at instant T4.

On the right side of FIG. 10, a variant is shown. At instant T5, the truck driver applies the park brake. At instant T6, the truck driver puts the gear into Neutral. At instant T7, the trailer supply line is purged to apply trailer park brake.

A driver seat occupancy sensor and/or a drowsiness surveillance camera arranged to determine the second condition representative of a presence or activity of a driver of the truck in the truck's cabin. One sensor delivers a presence information until instant T8, when the driver leaves the cabin.

Time difference T8–T7 denotes the above mentioned "driver cab timw".

At this moment T8 only, the confidence index CDI start to decrease. The confidence index CDI decreases with time and becomes lower that the predefined confidence threshold CDIS at instant T9.

Miscellaneous

We note here that even though the electrical connection with the trailer can be determined, this connection may undergo some trouble or physical connection may be incorrectly coupled, or driver might have forgotten to couple the electrical line. We also note that pneumatic testing can be considered more relevant since brake are at stake and can be damaged if we rely only on electrical line.

The invention claimed is:

1. A method carried out in a truck configured to be coupled to a trailer, wherein a trailer connection status is determined by a pneumatic line test performed on a pneumatic line arranged to pneumatically couple the trailer to the truck, the method comprising:

determining a line test circumstantial criterion, such line test circumstantial criterion determining whether or not a pneumatic line test is to be performed, performing the pneumatic line test when allowed by the line test circumstantial criterion, and updating the trailer connection status, from a result of the performing the pneumatic line test and/or as time passes, the trailer connection status supplemented by a confidence index, which decreases over time unless refreshed or reset by an updating event, the confidence index being frozen as long as a presence of a driver in a cabin of the truck is determined, wherein the line test circumstantial criterion comprises at least a first condition representative of an air pressure prevailing in the pneumatic line below a predefined test threshold, a second condition representative of a presence of the driver in the cabin of the truck, and a third condition representative of the confidence index being less than a predefined confidence threshold, wherein the pneumatic line test is performed while the second condition representative of a presence of the driver in the cabin of the truck is met.

2. The method of claim 1, wherein the second condition representative of a presence of the driver of the truck in the cabin includes relying on a maneuver performed by the driver in the cabin of the truck.

3. The method of claim 1, wherein the confidence index exhibits a value between a maximum value and a minimum value, and wherein the confidence index is reset to the maximum value whenever the pneumatic line is inflated or whenever the truck is determined to be in driving conditions.

4. The method of claim 1, wherein the line test circumstantial criterion comprises a fourth condition representative of an air pressure prevailing in an air reservoir.

5. The method of claim 1, wherein the pneumatic line test is done by a temporary inflation of the pneumatic line, and an outcome of the pneumatic line test is inferred from a pressure profile versus time acquired in response to the temporary inflation.

6. The method of claim 1, wherein the pneumatic line is a trailer air pressure supply line.

7. The method of claim 6, wherein when the pneumatic line test is positive, representative of a trailer actually pneumatically coupled, the supply of the trailer air pressure supply line is continued and maintained as long as required by a trailer management function.

8. The method of claim 1, wherein the method further comprises:

propagating the trailer connection status through a truck bus.

9. A system comprising a parking brake unit having a control unit, the system being installed in a truck configured to be coupled to a trailer, wherein the control unit is configured to determine a trailer connection status, indicating whether the trailer is coupled or uncoupled, from at least a pneumatic line test performed on at least a pneumatic line arranged to pneumatically couple the trailer to the truck, wherein the control unit is configured to:

determine a line test circumstantial criterion, such line test circumstantial criterion determining whether or not a pneumatic line test is to be performed, perform the pneumatic line test, when allowed by the line test circumstantial criterion, and update the trailer connection status, from a result of the performed pneumatic line test and/or as time passes, the trailer connection status supplemented by a confidence index, which decreases over time unless refreshed or reset by an updating event, the confidence index being frozen as long as a presence of a driver in a cabin of the truck is determined, wherein the line test circumstantial criterion comprises at least a first condition representative of an air pressure prevailing in the pneumatic line below a predefined test threshold, a second condition representative of a presence of the driver in the cabin of the truck, and a third condition representative of the confidence index being less than a predefined confidence threshold, wherein the pneumatic line test is performed while the second condition representative of a presence of the driver in the cabin of the truck is met.

10. The system of claim 9, wherein the control unit is further configured to handle a confidence index that supplements the trailer connection status, the confidence index is caused to decrease over time unless refreshed or reset by an updating event, and wherein the line test circumstantial criterion further comprises at least a third condition representative of the confidence index being less than a predefined confidence threshold.

11. The system of claim 9, wherein the system further comprises a gearbox gear lever/control, a park brake knob, and a trailer supply knob arranged to determine the second condition representative of a presence of the driver of the truck in the cabin.

12. The system of claim 9, wherein the system further comprises a driver seat occupancy sensor and/or a drowsiness surveillance camera arranged to determine the second condition representative of a presence of driver of the truck in the cabin.

13. The system of claim 9, further comprising a pressure sensor arranged on the trailer supply line.

14. A truck comprising the system of claim 9.

\* \* \* \* \*